June 27, 1944.　　　M. F. HARRINGTON　　　2,352,432
SURGICAL CAST CUTTER
Filed Aug. 18, 1943
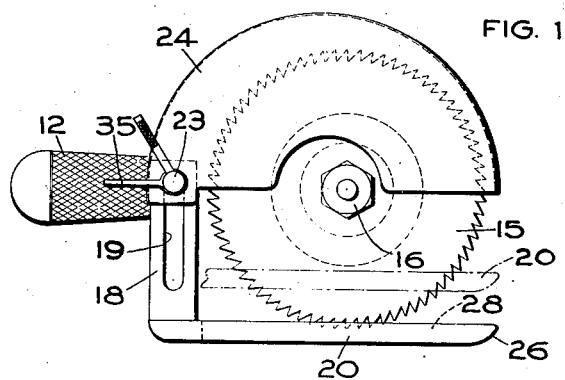
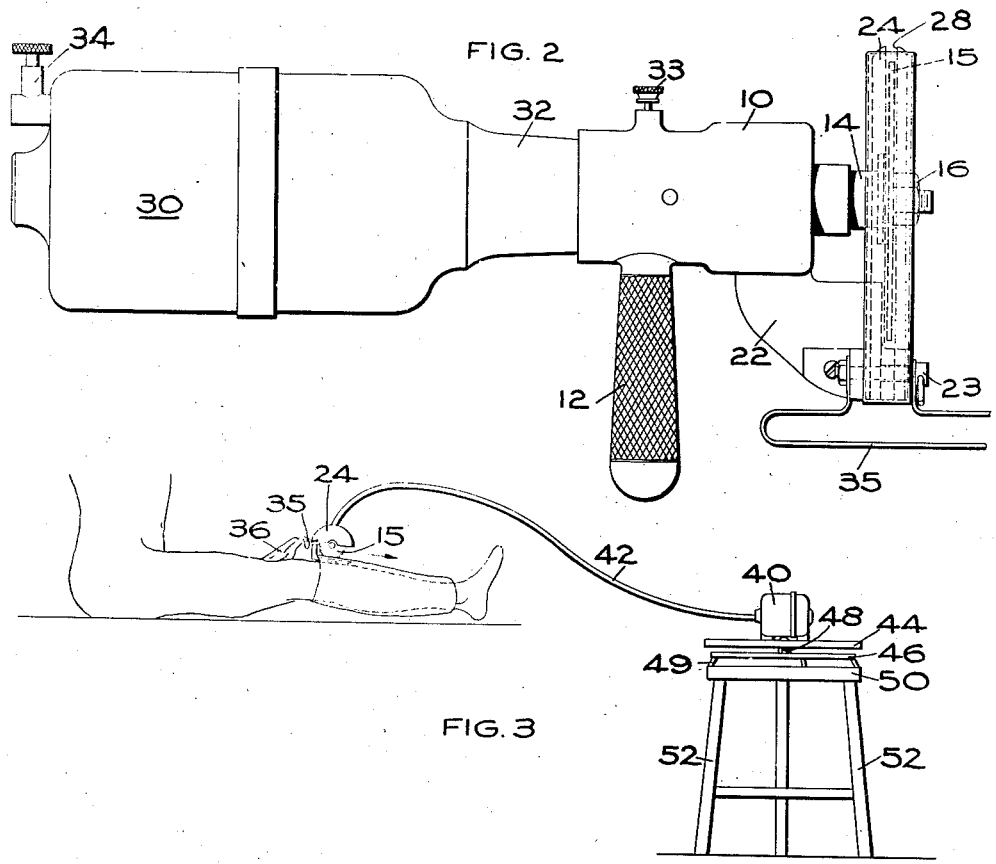
INVENTOR
MICHAEL F. HARRINGTON
BY
Beau, Brooks, Buckley & Beau
ATTORNEYS Patented June 27, 1944

2,352,432

UNITED STATES PATENT OFFICE 2,352,432

SURGICAL CAST CUTTER

Michael F. Harrington, Buffalo, N. Y.

Application August 18, 1943, Serial No. 499,106

1 Claim. (Cl. 30—167)

This invention relates to improved means for cutting surgical casts away from the body of a patient.

One of the objects of the invention is to provide a device for the purpose aforesaid which is adapted to sever surgical casts or the like from any portion of a patient's body without transmitting nerve-wracking or paining or fatigue-producing stresses to the patient.

Another object of the invention is to provide a device for the purpose aforesaid which is adapted to be handled by the operator thereof with improved convenience and facility.

Other objects and advantages will appear in the specification hereinafter.

In the drawing:

Fig. 1 is an end view of a device of the invention;

Fig. 2 is a top plan thereof; and,

Fig. 3 illustrates another form of device of the invention in operation upon a limb cast.

The invention comprises, generally stated, a device including a frame portion having convenient hand-hold formations thereon, and a circular saw device disposed in combination with a guide device of novel formation in such manner that the saw blade and guide device elements of the mechanism are adapted to be pressed into engagement with the cast to be removed in such manner as to easily effect severance of the cast without imposing strains, injury, or irritating tugging or frictional effects upon the patient.

More specifically, the invention is illustrated in Figs. 1-2 of the drawing as comprising a frame member 10 formed of cast metal or the like and having a generally cylindrical shape and a handle bar 12 extending rigidly therefrom to be gripped by the operator of the mechanism. The member 10 carries a shaft 14 to extend from one end thereof and mounts a circular saw blade 15. A locking nut 16 is employed to provide for detachable mounting of the saw blade upon the shaft, whereby blades may be replaced as required. Thus, different blades having saw-teeth of different pitches may be employed on the machine when working against cast materials having different saw-resistant characteristics; and whenever the blades become worn they may be replaced with utmost convenience.

The saw guide device of the mechanism comprises an L-shaped member formed of metal or the like which includes a support arm portion 18 having a vertical slot 19 therein, and a shoe portion 20 extending at right angles from the support and tangentially of the saw blade 15. The support arm 18 is mounted relative to the frame 10 by means of a bracket 22 extending therebetween, and a wing nut-screw connection device 23 is provided to clamp the shoe arm 18 upon the bracket 22 at any desired adjusted position thereon. A safety guard 24 in the form of a semi-drum-like casing is also conveniently mounted upon the arm 18 to encompass the upper half of the saw blade so as to guard the operator of the machine against injurious contacts with the revolving saw blade.

The shoe device 20 is in the form of a relatively flat skid being upwardly rounded at the forward end portion 26 thereof so as to be adapted to be inserted between the cast to be removed and the patient, with utmost smoothness of inserting operation. The shoe 20 is slotted therethrough as indicated at 28 in registry with the periphery of the saw blade 15, whereby the shoe 20 may be adjusted relative to the bracket 22 from the solid line position thereof shown in Fig. 1 to the broken line position shown.

In Fig. 2 an electric motor 30 is shown to be mounted in driving connection with the shaft 14 by being telescopically inserted at a bell end portion 32 into the frame member 10. A set screw 33 is provided for detachably locking the motor in mounted relation upon the frame 10. It will be understood that the motor armature shaft and the saw carrying shaft may be formed with any suitable coupling means adapted to cooperate upon assembly of the motor upon the frame 10 to provide a positive driving connection between the motor and the saw blade.

Thus, it will be understood that the motor may be arranged to be energized from any suitable power supply source, as through an extension cord leading from the motor terminal 34 and plugged into a wall outlet socket or the like; and that a control switch for the motor 30 may be employed in connection with the power conductor in any convenient manner.

The cutter device of the invention is adapted to be gripped by the operator by holding the handle 12 in one hand and the motor case 30 in the other hand, and the device may therefore be moved so that the shoe 20 slips in between the patient and the section of the cast to be severed. The saw 15 thereupon engages against the material of the cast in such manner as to sever it in the direction of movement of the cutter without applying tugs or strains or frictional irritations against the body of the patient, and without applying strains against the cast such as would be transmitted therefrom to the patient, as for example scissor-type cutting devices are employed for cast cutting purposes. Hence, the cutter of the invention eliminates the possibility of injury or discomfort to the patient, while being of improved convenience to the operator.

Preferably, the bracket 22 also mounts a generally U-shaped spring clip as designated at 35, whereby a towel or other suitable fabric piece 36 may be slidably inserted between the jaws of the clip 35 in such manner as to be trailed therebehind as the cutter moves relative to the cast being operated upon. The clip 35 supports the forward end of the fabric 36 at slightly above the elevation of the stream of cuttings and dust discharged behind the saw 15; and the fabric 36 will preferably be moistened so as to more effectively catch any dust or cutting particles, and to prevent them from scattering into the atmosphere behind the cutter.

Thus, as illustrated in Fig. 1, the shoe 20 may be adjusted so as to either slip between the patient and the cast while the blade 15 cuts into the cast from externally thereof; or the shoe 20 may be elevated, as to the broken line position shown in Fig. 1, and the blade 15 may then be directed to cut into a cast while the shoe 20 limits the depth of the cut. The device of the invention may be desirably employed as last described whenever the cast to be severed contains metal reinforcing devices or the like, because the machine may then be handled so that the saw blade avoids damaging contacts with such metal parts. If desired, a thin metal sheet may be inserted, independently of the machine, between the body of the patient and the cast to be severed therefrom whenever the machine is to be employed with the shoe 20 elevated out of patient-guarding position.

As illustrated in Fig. 3, the cutter of the invention may conveniently comprise a frame and handle and saw unit 10—12—15, as illustrated in Figs. 1-2; but in lieu of employing the motor 30 in direct connection with the frame device 10 as in Fig. 1, a motor 40 may be mounted remotely from the cutter and connected thereto by means of a flexible cable 42. It will be understood that the end portion of the cable 42 may be slip-fitted into the socket end portion of the frame 10 in lieu of the reduced portion 32 of the motor case 30; and the motor 40 may be mounted upon a plate 44 which is rotatably carried upon a table 46 by means of a pivot 48. The plate 46 may in turn be supported by means of spaced leg devices 49 from a base plate 50 which mounts upon legs 52 for support from any suitable ground surface or the like. This form of the invention is particularly suitable for use in hospitals or doctors' offices or the like, whereby added convenience occasioned by elimination of the weight of the motor 30 from the unit to be carried by the operator is provided.

I claim:

A surgical cast cutting device comprising a frame, a circular saw mounted upon said frame to extend at peripheral portions thereof for sawing purposes, said frame having a handle portion extending rearwardly therefrom to be gripped by the operator while holding said device in cutting position against a surgical cast, a guide shoe adjustably mounted on said frame and having a foot portion thereof slotted to permit said saw to extend therethrough whereby said shoe device may be adjusted in directions radially of said saw blade axis, and a bracket device extending from said frame and adapted to engage a fabric member to trail behind said saw for catching cuttings therefrom.

MICHAEL F. HARRINGTON.